United States Patent [19]
Miller

[11] Patent Number: 4,606,682
[45] Date of Patent: Aug. 19, 1986

[54] GEAR SHAPING MACHINE

[76] Inventor: John R. Miller, 4510 Hewitts Pt. Rd., Oconomowoc, Wis. 53066

[21] Appl. No.: 651,180

[22] Filed: Sep. 17, 1984

[51] Int. Cl.$^4$ .............................................. B23F 9/08
[52] U.S. Cl. ...................................... 409/34; 409/19; 409/21; 409/31; 409/41
[58] Field of Search ...................... 409/19, 21, 31, 33, 409/41, 34

[56] References Cited

U.S. PATENT DOCUMENTS

| | | | |
|---|---|---|---|
| 676,227 | 6/1911 | Fellows | 409/34 |
| 2,025,034 | 12/1935 | Avis | 409/34 |
| 2,125,304 | 8/1938 | Miller | 409/34 |
| 2,129,858 | 9/1938 | Miller | 409/34 |
| 3,722,359 | 3/1973 | Hans et al. | 409/34 |

Primary Examiner—Donald R. Schran
Attorney, Agent, or Firm—Fred Wiviott

[57] ABSTRACT

A gear shaping machine includes a cutter mounted at the lower end of a spindle and a worm gear surrounding the spindle. A first guide is provided on the spindle and has axially extending guide flutes formed thereon. A second guide is disposed in surrounding relation to the spindle and has axially extending guide grooves formed in an inner surface for sliding engagement with the spindle guide flutes and helically advancing guide flutes formed in its outer surface for engaging corresponding guide flutes formed in the inner surface of the worm gear. A first adjustable eccentric is coupled to the spindle for controlling the vertical movement thereof and a second adjustable eccentric is coupled to the second guide for selectively controlling its vertical movement.

15 Claims, 5 Drawing Figures

GEAR SHAPING MACHINE

BACKGROUND OF THE INVENTION

This invention relates to gear shaping machines and more particularly to a gear shaping machine in which the helical advancement of teeth being cut in a gear blank can be changed without removing and replacing cutter guides.

In prior art gear shaping machines, a blank is mounted on a work table which is adapted to rotate the blank at a desired rate of speed about its central axis. The rotation of the blank is synchronized with the rotation of a cutting tool. The gear is generated by the congugate action of the blank rolling together with the cutting tool whose teeth are in the form of a mating gear for the gear being cut. In such prior art machines, the blank remains axially stationary during the shaping process while the cutting tool is reciprocated axially relative to the blank thereby cutting or shaping the teeth desired into the surface of the blank. The cutter makes a series of cutting strokes in the surface of the blank as the cutter and blank rotate in synchronism. Simultaneously, the cutter may be advanced radially relative to longitudinal axis of the blank to the depth of the teeth desired.

The longitudinal extent of the cutting tool stroke is controlled by an axially reciprocating spindle. In prior art type of machine, this is accomplished by coupling the spindle to an adjustable eccentric mounted on a drive shaft or by a hydraulic piston. The distance of the eccentric from the drive shaft axis determines the extent that the spindle is reciprocated. By adjusting the degree of eccentricity the machine operator can selectively increase or decrease the stroke length as required by the thickness of the blank being shaped.

As the cutter spindle is reciprocated axially it is also rotated in synchronism with the gear blank. This rotational movement may be provided, for example, by a worm driven worm gear which remains axially fixed while the spindle reciprocates. The coupling between the worm gear and the spindle simulates a sliding key or spline to allow axial movement of the spindle while it is being rotated. This coupling is referred to as a guide. In prior art machines; the inner portion of the guide is fixed to the spindle and is named the spindle portion and the outer portion of the guide is fixed to the worm gear and is named the worm gear portion. The guide also acts to establish the helix angle, if any, of the gear being cut. For example, if the helix angle of the work piece is to be zero degrees, the mating surfaces of the guide extend in the axial direction. On the other hand, if the helix angle of the work piece is to be greater than zero degrees, the mating surfaces of the guide have an appropriate helix angle, or finite lead, causing the reciprocating axial movement of the spindle to produce a corresponding helical motion of the cutter teeth. The pitch or lead of the guide must be such that the cutter teeth follow the helix of the gear. A single helical guide may be used to cut different gears having different helix angles by varying the outside diameter of the cutter. However, this helical range is limited by cutter diameter limitations.

In prior art machines, a number of guides were used, each having a different helix angle ranging from zero to some large finite value. Each time a change in the helix angle was required, it was necessary for the machine operator to shut down the machine and replace the guide.

SUMMARY OF THE INVENTION

It is an object of the invention to provide a new and improved gear shaping machine.

Another object of the invention is to provide a gear shaping machine in which the helix angle of successive gear blanks can be modified without removing and replacing portions of the apparatus.

In general terms the invention comprises a gear shaping machine having first means for rotating a gear blank, and second means for rotating the cutter. Third means is coupled to the cutter for moving the same axially into and out of engagement with the gear blank while the two are rotating so that the teeth are cut into the blank. Fourth means is provided for advancing the rotational angle of the cutter relative to the gear blank while the two are being rotated and while the cutter is being moved axially so that a helix is formed on the teeth being cut into the gear blank. Fifth means are provided for adjusting the rate at which the rotational angle of the cutter is advanced relative to the gear blank. The fifth means is independent of the second and third means so that the degree of helix in the teeth being cut into the gear blank can be changed in successive gear blanks without removing and replacing the fifth means.

DETAILED DESCRIPTION OF THE PREFERRED EMBODIMENT

Figure 1:
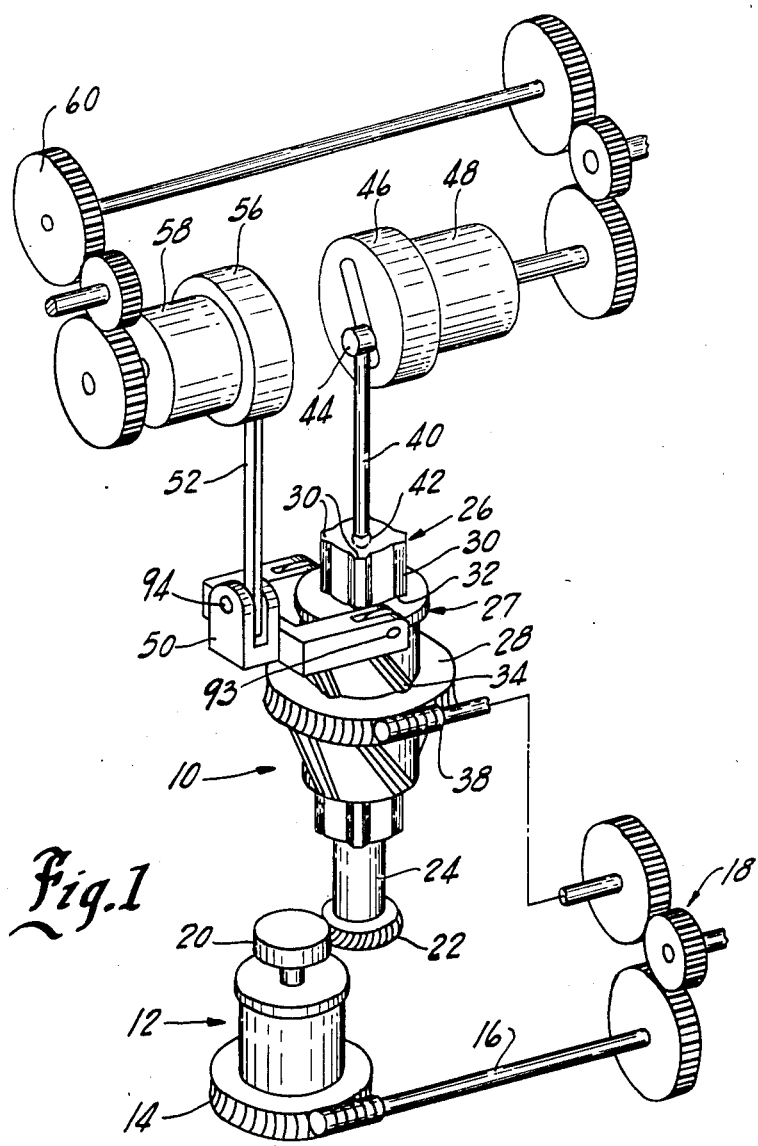
FIG. 1 is a schematic illustration of a portion of a gear shaping machine incorporating the present invention.

FIG. 1 schematically illustrates a gear cutting machine 10 in accordance with a preferred embodiment of the invention. In general terms, the machine includes a work table 12 which is mounted on a bearing (not shown) for rotation by means of a worm gear 14 which meshes with a worm 16 coupled to a suitable drive 18. The work piece 20 is mounted coaxially atop the table 12 and is rotatable therewith. The foregoing is conventional and will not be described in detail for the sake of brevity.

As those skilled in the art will appreciate, a gear is formed by engaging the work piece with a cutter 22 which comprises a member which is complimentary to the gear being formed from the work piece 20. The cutter 22 is mounted at the lower end of a spindle 24 which is displaced through various gear shaping movements as will be described more fully below. Mounted adjacent the upper end of the spindle 24 is a first guide 26, a second guide 27 and a worm gear 28. The first guide 26 is fixed to spindle 24 and includes an outer surface 29 (FIG. 5) having a plurality of flutes 30 which, in the illustrated example, are straight and extend in the axial direction. The second guide 27 is mounted on the first guide 26 and has an axial bore 31 and internal grooves 32 which are complementary with and slidably engage the outer surface 29 of guide 26 and the flutes 30. The guide 27 also has a cylindrical outer surface 33 and flutes 34 which are shown to advance helically. The worm gear 28 has an axial bore 35 which is complimentary to and slidably engages the guide 27 and has internal grooves 36 which are complimentary and slidably engage the flutes 34. The worm gear is fixed against axial movement and is rotatably driven by a worm which is coupled to the drive 18. While the flutes 30 and 34 are shown on the outer surfaces of the guides 26 and 27 and the grooves in the inner surfaces of the bores 31 and 35, this may be reversed, if desired, with the flutes formed on surfaces 31 and 35 and the grooves in surfaces 29 and 33.

The reciprocal motion of the spindle 24 may be accomplished well-known manner, such as, a link 40 is coupled at its lower end by a universal pivot 42 mounted at the upper end of the spindle 24. The other end of link 40 is coupled to an adjustable eccentric assembly 46 which is mounted on a first shaft 48. The second guide 27 is connected by a yoke to the lower end of a link 52. Similarly the upper end of link 52 is connected to an adjustable eccentric assembly 56 mounted on shaft 58. The shafts 48 and 58 are coupled to a common drive any suitable manner, such as the gear drive 60.

Figure 5:
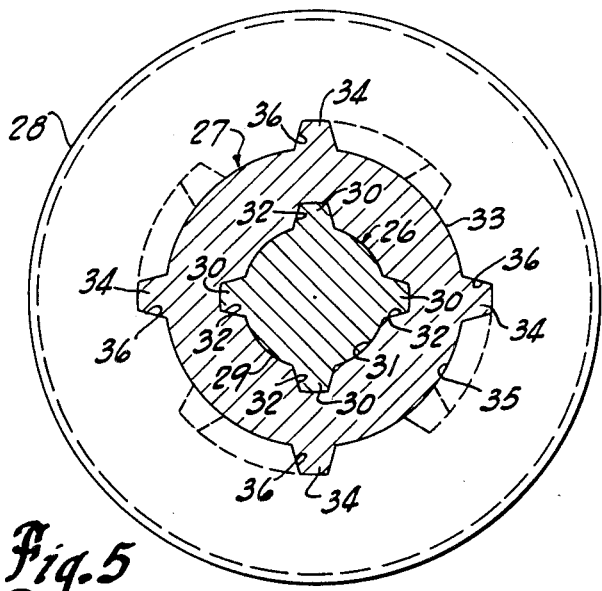
FIG. 5 is a view taken along lines 5—5 of FIG. 1.

FIGS. 2, 3, 4 and 5 show the guides 26 an 27 and their relation to the cutter spindle 24 in greater detail. More specifically, the spindle 24 is an elongate, cylindrical member having the guide 26 fixed to or integrally formed at its upper end. The guide 26 is defined by a portion at the upper end of the spindle 24 of increased cross sectional area and extends downwardly for an appreciable portion of its length. The flutes 30 are formed on the outer surface 29 of the guide 26 and extend downwardly from its upper to its lower end. The shape of the flutes 30 depends upon the helix angle of the gear to be cut. Therefore, while the flutes 30 are shown in the illustrated embodiment as being linear from their upper to their lower ends, they may also be helically advancing. Additionally, the flutes may taper inwardly from the surface 29 to their outer edges as shown in FIG. 5, although this shape is also a matter of choice.

The guide 27 comprises a generally tubular member disposed in surrounding relation to the guide 26 and is shown to be somewhat shorter in length, although in practice it may be equal to or longer than the guide 26. The axial bore 31 and the grooves 32 slidably engage the surface 29 and the flutes 30 on the guide 26. Since the flutes 30 on guide 26 and the grooves 32 in guide 27 are both linear in the illustrated embodiment, relative movement of the guides 26 and 27 will also be linear or axial. However, the flutes 30 and the complimentary grooves 32 may also be helically advancing in which case relative movement between the guides 26 and 27 would also be helical.

The outer surface 33 of the guide 27 is generally cylindrical and has an outwardly radiating flange 64. The flutes 34 extend the length of the guide 27 and are generally tapered from their inner to their outer edges. While the guides 26 and 27 are each shown to have four flutes 30 and 34 respectively, any suitable number may be employed.

The central opening 35 of worm gear 28 is circular and complimentary to the outer surface 33 of the guide 27. Upon relative axial movement of the guide 27 in the worm gear 28 there will also be relative rotational movement as a result of the shape of flutes 34 and the mating grooves 36 so that the net displacement between the guide 27 and the gear 28 will be relatively helical.

Figure 2:
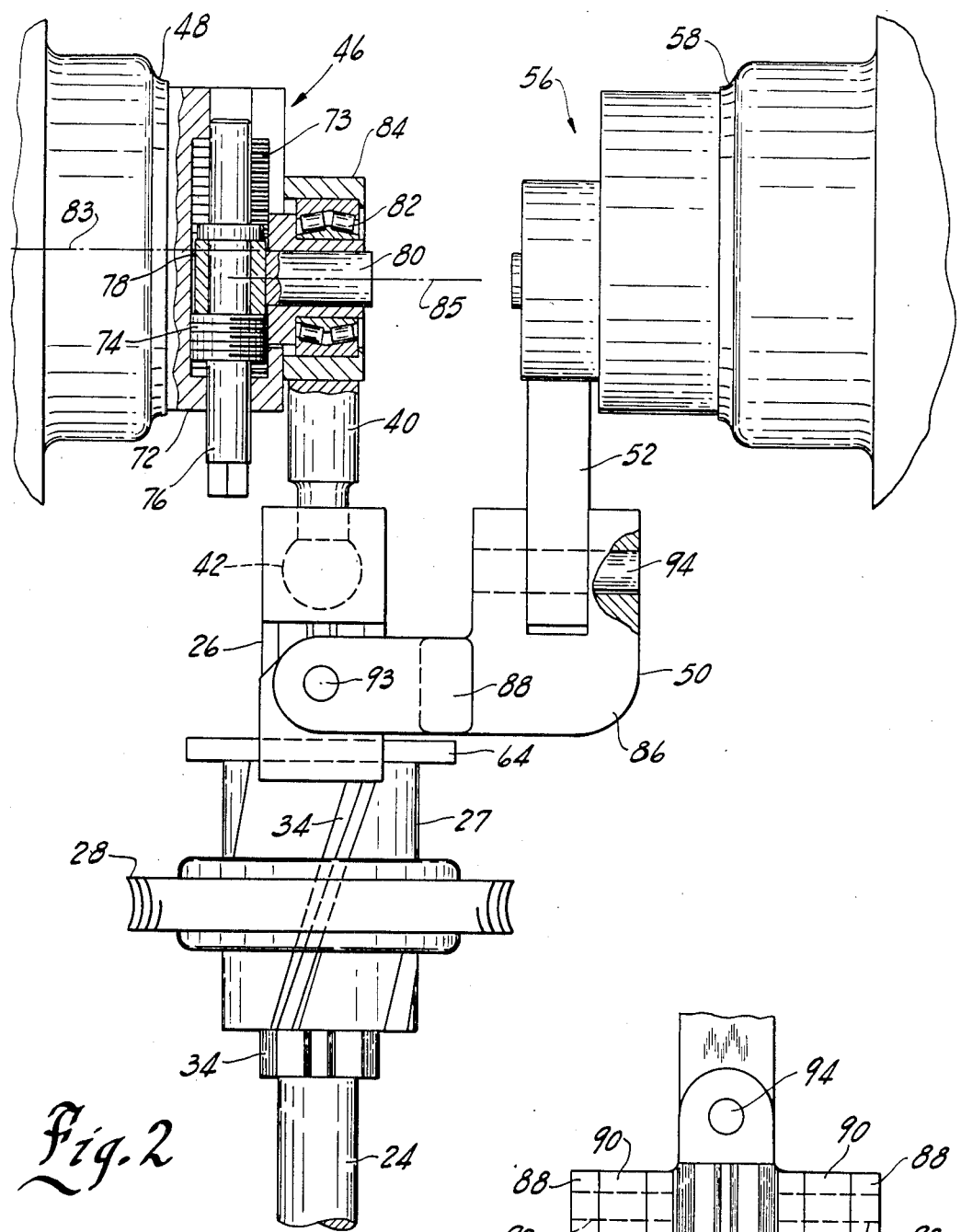
FIG. 2 is a side elevational view of a portion of the gear cutting machine shown in FIG. 1 which incorporates the present invention.

The eccentric assemblies 46 and 56 may be identical and, accordingly, only the assembly 46 will be discussed in detail. As seen in FIG. 2, the assembly 46 includes a disc-shaped crank member 72 fixed to shaft 48. The crank member 72 has a bore 73 extending diametrically through its central portion for receiving a threaded plug 74. A pin 76 is fixed to and extends axially from the opposite faces of plug 74 and through openings in the opposite sides of crank member 72 which openings are coaxial with bore 73. A sleeve 78 surrounds pin 76 for supporting a second pin 80 extending perpendicular to pin 76. Fixed to sleeve 78 and disposed in surrounding relation to the pin 80 is a bearing assembly 82 which rotatably supports a ring 84 affixed to the upper end of link 40.

It will be appreciated that when the pin 76 is rotated, the plug 74 will move longitudinally within the bore 73 and in a path normal to the axis 85 of the pin 58. This movement will displace the axis 84 of pin 80 relative to the axis 83 of shaft 58, thereby increasing or decreasing the degree of eccentricity of the pin 80. When the shaft 58 is rotated, the axis 85 of pin 80 will move in a circular path around axis 83 to displace the sleeve 84 in a corresponding path thereby reciprocating the link 40 and with it the cutter spindle 24 and the first guide 26. The vertical displacement of the cutter spindle 24 will be determined by the eccentricity of pin 80 which in turn is controlled by the position of plug 74 in bore 73.

It will be sufficient for purposes of understanding the invention to appreciate that the link 52 will be moved in a manner which is similar to that of link 40 to reciprocate the yoke 50 to an extent determined by the setting of eccentric 56. Because the eccentrics 46 and 56 are interconnected, such as by gearing 60, the reciprocation of guides 26 and 27 will be in synchronism.

While the spindle 24 and the guide 27 are reciprocated in the preferred embodiment by means of the eccentrics assemblies 46 and 56, those skilled in the art will appreciate that they can be displaced in any conventional manner. For example, a hydraulic cylinder may be employed for displacing spindle 24 and an attached linkage may be employed for displacing guide 27.

Figure 4:
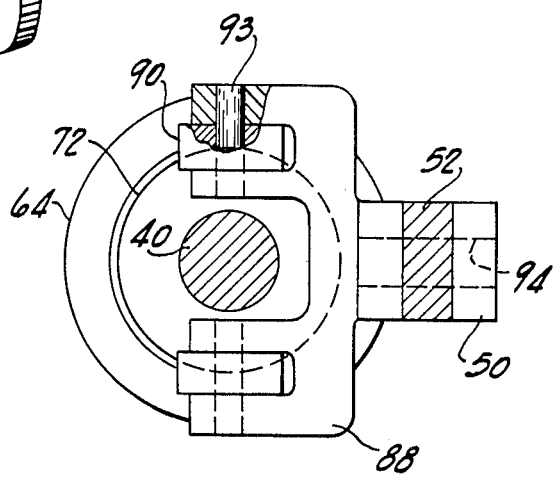
FIG. 4 is a view taken along lines 4—4 of FIG. 2.
Figure 3:
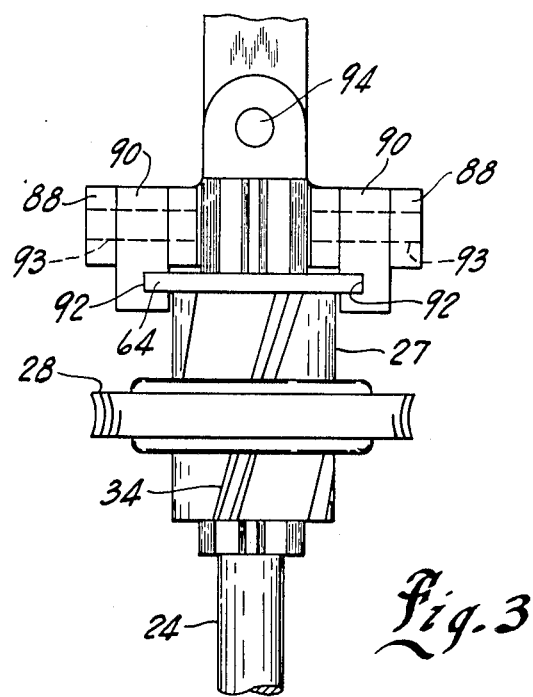
FIG. 3 is a view take along lines 3—3 of FIG. 2.

The yoke 50 is shown in FIGS. 2, 3 and 4 to include a body portion 86 having a pair of forwardly extending arms 88 which are formed at their remote ends for bracing the opposite sides of lugs 90. Each lug 90 has a notch 92 formed in its lower end for engaging the flange 64 of guide 27. In addition, aligned openings are formed through the forked ends of arms 88 and the lugs 90 for receiving connecting pins 93 therethrough. The body 86 of yoke 50 is also forked at its upper end for receiving the lower end of link 52. A pin 94 extends through aligned openings in the forked upper end of yoke body 86 and the lower end of link 52 for pivotally coupling the two. This defines a coupling between the yoke 50 and the guide 27 which permits the guide to rotate independantly of the yoke and in addition permits the guide 27 to be moved vertically as the yoke 50 is moved by the eccentric 56.

It can be seen that the engagement between the flutes 30 and the grooves 32 will provide a driving connection between the guides 26 and 27 but will permit relative vertical movement therebetween. Similarly the engagement between the futes 34 on guide 27 and grooves 36 in worm gear 28 will similarly provide a driving connection so that when the worm gear 28 rotates the guides 27 and 26 will rotate therewith. However, because the flutes 34 and the grooves 36 are helical, there will be relative rotational movement between the guides 26 and 27 and the worm gear 28 as the guide 27 is reciprocated with respect to the worm gear 28 which is axially fixed in position.

In operation, the work piece 20 and the spindle 24 are rotated in synchronism by the drive 28 acting through the worms 16 and 38 and the worm gears 14 and 28 respectively. The teeth in the blank 20 are cut while the tool 22 and the work piece 20 are rotated in unison and the spindle 24 is moved vertically by the eccentric 46 acting on the guide 26. In addition, the helix, if any, formed in the gear teeth being cut in blank 20 is determined by the distance and direction in which the guide 27 is reciprocated. For example, if the gear being formed from blank 20 is to have straight teeth without a helix, the eccentric 56 is adjusted so that the axis of pin 80 is in alignment with the axis of shaft 58 so that no eccentricity exists. In this position, the guide 27 will not reciprocate whereby the tool 22 and the blank 20 will rotate in unison and there will be no helical advancement of the tool 20 as it descends.

If some helix is desired on the gear teeth being formed in blank 20 the pin 80 will be moved into an eccentric position, the degree and direction of which is determined by the amount and direction of helix desired. The greater the degree of eccentricity, the greater the helix angle. Thus, as the guide 27 is reciprocated, the cutting tool 22 will be advanced or retarded relative to the blank 20 causing a helix to be imparted to the gear being cut.

In the illustrated embodiment, the flutes 30 in guide 26 are shown to be straight. However, these flutes may also have a helix in which case some helix will be provided to the teeth being cut with this being increased or decreased by the helix and amount of linear movement imparted to guide 27. In any event, it will be appreciated that the helix in the teeth being cut can be changed from blank to blank merely by adjusting the eccentrics 46 and 56 and without changing the guides 26 or 27.

While only a single embodiment of the invention has been illustrated and described, it is not intended to be limited thereby but only by the scope of the appended claims.

I claim:

1. A gear cutting machine having first rotating means for rotating a gear blank,
   a cutter,
   second rotating means for rotating said cutter,
   first cyclic means for cyclicly moving said cutter axially into engagement with the gear blank while the two are rotating so that gear teeth are cut into said blank,
   first guide means including helical guide disposed between and coupling the second rotating means and the first guide means, said first guide means being axially movable independently of said second rotating and first cyclic means for altering the rotary speed of said cutter relative to said gear blank during each cycle and while the same are being rotated and said cutter is being cycled axially so that a helix is formed on the teeth being cut into said gear blank,
   second cyclic means coupled to said guide means for cycling the same, adjusting means for adjusting the stroke of said second cyclic means independent of the second rotating means and first cyclic means so that the angle of the gear helix being cut into said blank can be changed in successive gear blanks without removing said second rotating means, first cyclic means or first guide means.

2. The gear cutting machine as set forth in claim 1 wherein said second rotating means comprises gear means, said helical guide of said first guide means coupling said gear means to said cutter, coupling means disposed between said cutter and said first guide means and including a second guide means to permit axial movement of said cutter relative to first guide means while providing a rotating connection therebetween.

3. The gear cutting machine as set forth in claim 2 wherein said second guide means comprises flutes formed on one of the cutter and first guide means and mating grooves formed on the other, and said helical guide means comprises flutes formed on one of the first guide means and the gear and grooves formed on the other, said latter flutes and grooves being helically advancing.

4. The gear cutting machine as set forth in claim 3 wherein said first cyclic means comprises first adjustable eccentric means coupled to said cutter for adjustably controlling the length of the stroke thereof and second adjustable eccentric coupled to the first guide means for controlling the length of the stroke thereof.

5. The gear cutting machine as set forth in claim 1 wherein said first cyclic means includes first adjustable eccentric means coupled to said cutter for adjustably controlling the length of the stroke thereof, said second cyclic means including a second adjustable eccentric coupled to the first guide means for adjustably controlling the length of the stroke thereof.

6. The gear cutting machine set forth in claim 1 wherein said first cyclic means comprises pressure cylinder means and said second cyclic means comprises a mechanical linkage coupled to said first means.

7. A gear cutting machine having first rotating means for rotating a gear blank,
   a cutter,
   second rotating means for rotating said cutter in synchronism with the gear blank,
   first axially movably guide means for coupling said cutter and said second rotating means to provide a driving connection therebetween and to permit cyclic axial movement of the cutter,
   first adjustable drive means for cyclicly moving the cutter axially into engagement with the gear blank while the two are rotating so that gear teeth are cut into the blank,
   second guide means disposed between the first guide means and the second rotating means for providing a driving connection therebetween, said second guide means being axially movable relative to said first guide means and including helical means of coupling the second guide means to the second rotating means so that upon cyclic axial movement of said second guide means the rotational speed of the cutter will be changed relative to the gear blank,
   second adjustable drive means for cyclicly moving the second guide means axially,
   said first and second drive means being independently adjustable so that the rotational speed of the cutter relative to the gear blank can be adjusted independently of the rate at which said cutter is moved axially whereby the helix angle on teeth being cut into the gear blank can be varied between successive blanks.

8. The gear cutting machine set forth in claim 7 wherein said first guide means has a helix angle different from said second guide means.

9. The gear cutting machine set forth in claim 7 wherein said first guide means extends in the axial direction.

10. The gear cutting machine set forth in claim 7 first flutes formed on one of the cutter and said first guide means and mating grooves are formed on the other of said cutter and first guide means, said second rotating means comprising a gear, and second flutes formed on one of the second guide means and the gear and grooves formed on the other thereof, said second flutes and grooves being helically advancing.

11. The gear cutting machine set forth in claim 10 wherein the first grooves and flutes extend in the axial direction.

12. The gear cutting machine set forth in claim 11 herein said first and second adjustable drive means comprises first and second adjustable eccentric means coupled to the cutter and second guide respectively.

13. The gear cutting machine set forth in claim 11 wherein said first and second drive means comprises cylinder means.

14. A method for shaping a gear comprising the steps of:
providing a first guide on which a gear cutter is mounted and a second guide disposed between the first guide and a driving gear and being axially movable relative thereto, and providing driving connections between said first guide and said gear and said second guide and said cutter,
rotating a gear blank,
rotating the cutter adjacent to said gear blank, and at the same peripheral speed,
cyclicly moving said cutter axially into engagement with the gear blank while the two are rotating so that gear teeth are cut into said blank,
and cyclicly moving the second guide axially to cyclicly change the rotational speed of the cutter relative to that of the gear blank while the cutter is being moved axially in the direction parallel to its axis of rotation,
controlling the stroke through which the cutter is moved axially,
controlling the stroke of the second guide relative to the gear blank and independently of the stroke at which the cutter is moved cyclicly in the axial direction.

15. A method for shaping a gear comprising the steps of providing a first guide on which a gear blank is mounted and a second guide disposed between the first guide and a driving gear wherein the second guide is axially movable relative to the first guide and the driving gear and wherein there is a driving connection between the first guide and the second guide and a second driving connection between the second guide and the driving gear and wherein the second guide is helical, the method comprising the steps of:
rotating the driving gear to rotate the gear blank,
rotating a cutter adjacent the gear blank and at the same peripheral speed,
reciprocating the cutter axially into engagement with the gear blank while the two are rotating so that gear teeth are cut into the blank,
reciprocating the second guide axially to change the rotational speed of the cutter relative to that of the gear blank while the cutter is being reciprocated in the direction parallel to its axis of rotation,
controlling the stroke at which the cutter is reciprocated,
controlling the stroke at which the second guide is reciprocated independently of the stroke of the cutter so that the rotational speed of the cutter is adjusted relative to that of the gear blank.

* * * * *